United States Patent
Nonaka (10) Patent No.: US 8,463,062 B2
(45) Date of Patent: Jun. 11, 2013

(54) IMAGE TRANSMISSION APPARATUS, METHOD, RECORDING MEDIUM, IMAGE OUTPUT APPARATUS AND IMAGE TRANSMISSION SYSTEM INCLUDING PATTERN DETERMINATION UNIT

(75) Inventor: Shunichiro Nonaka, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 343 days.

(21) Appl. No.: 12/874,043

(22) Filed: Sep. 1, 2010

(65) Prior Publication Data

US 2011/0052090 A1 Mar. 3, 2011

(30) Foreign Application Priority Data

Sep. 1, 2009 (JP) .................................. 2009-201734

(51) Int. Cl.
*G06K 9/36* (2006.01)
*G06K 9/46* (2006.01)

(52) U.S. Cl.
USPC .......................................................... 382/251

(58) Field of Classification Search
USPC .. 382/181, 232, 233, 239, 250, 251; 358/453, 358/462; 375/224, 240
See application file for complete search history.

(56) References Cited

U.S. PATENT DOCUMENTS

| 5,530,750 | A  | * | 6/1996  | Akagiri       | 704/500 |
| 6,661,839 | B1 | * | 12/2003 | Ishida et al. | 375/240 |
| 6,747,762 | B1 | * | 6/2004  | Josephsen et al. | 358/453 |
| 2007/0192509 | A1 | | 8/2007 | Ohtsuka et al. | |
| 2011/0052090 | A1 | * | 3/2011 | Nonaka | 382/251 |

FOREIGN PATENT DOCUMENTS

| JP | 2007-200145 | 8/2007 |
| JP | 2007-213273 | 8/2007 |
| JP | 2007-221229 | 8/2007 |

OTHER PUBLICATIONS

Notification of Reason(s) for Rejection dated Aug. 2, 2012, with English translation.

* cited by examiner

*Primary Examiner* — Amir Alavi
(74) *Attorney, Agent, or Firm* — McGinn IP Law Group, PLLC (57) ABSTRACT

A server device compares an image before changing with an image after changing and specifies a difference image that is an image part different between the two images. The server device determines patterns of boxes (rectangles) enclosing the difference image. In image transmission from the server device, the box becomes a macro block being a unit of image compression. The server device specifies from among the patterns of the enclosing box group, an optimal box group that is a pattern of the enclosing box group requiring the shortest response time. The server device sets each of the boxes that make up the specified optimal box group as a unit of macro block, and performs compression coding of the difference image in the set units. The server device transmits partial image information including the compression-coded difference image and the coordinates of the difference image to the client device.

7 Claims, 7 Drawing Sheets

BOX WITH DIFFERENCE (SIZE 16X16)
BOX WITHOUT DIFFERENCE (SIZE 16X16)

FIG.10B

RECTANGLE

FIG.11A

SEARCH ALONG VERTICAL SIDE

FIG.11B

SEARCH ALONG HORIZONTAL SIDE

IMAGE TRANSMISSION APPARATUS, METHOD, RECORDING MEDIUM, IMAGE OUTPUT APPARATUS AND IMAGE TRANSMISSION SYSTEM INCLUDING PATTERN DETERMINATION UNIT

BACKGROUND OF THE INVENTION

1. Field of the Invention

The presently disclosed subject matter relates to a technology for transmitting partial compression-coded image data.

2. Description of the Related Art

A system in Japanese Patent Application Laid-Open No. 2007-200145 includes a display unit for displaying an image, a frame memory area for temporarily storing an image for displaying the image on the display part, a determination unit for determining whether the image to be displayed on the display unit is stored in the frame memory area or not, an image request unit for requesting transmission of the image to a server device when the determination unit determines that the image is not stored in the frame memory area, an image reception unit for receiving the image transmitted from the server device, a memory control unit for storing the image received by the image reception unit into the frame memory area, and a display control unit for controlling so that the image stored in the frame memory area is displayed on the display unit.

A system in Japanese Patent Application Laid-Open No. 2007-213273 determines whether an instruction for enlarged display of an image displayed on a display unit is not less than a predetermined magnification ratio. When it is determined that the instructed magnification ratio is the predetermined magnification ratio or higher, the system requests a server device to transmit a server-enlarged image enlarged to the predetermined magnification ratio, receives the server-enlarged image transmitted from the server device, and stores the received server-enlarged image in a frame memory area for temporarily storing the image in order to display the image on the display unit. On the other hand, when it is determined that the instructed magnification ratio is less than the predetermined magnification ratio, the system calculates a client-enlarged image in which the image stored in the frame memory area is enlarged at the predetermined magnification ratio, and controls the display unit to display the server-enlarged image stored in the frame memory area or the calculated client enlarged image.

SUMMARY OF THE INVENTION

According to Japanese Patent Application Laid-Open No. 2007-200145, in a server based computing system, only when a screen not stored in the frame memory area of the client device is generated, the client requests the server to transmit an image, thereby reducing load in CPU and communication in the client device. However, in the most cases where a screen is changed by some operations in the client device, only a part of the screen is rewritten. In the conventional technologies, even if a part of the screen is rewritten, data of the entire screen is transmitted, resulting in a problem of inefficiency in reduction of CPU load and communication load.

The presently disclosed subject matter realizes reduction of processing load involving a screen change in a client device and communication load from a server device.

The presently disclosed subject matter provides an image transmission apparatus comprising: a difference image specifying unit for specifying a difference image indicating a difference between an image before changing and an image after changing; a pattern determination unit for determining a pattern for optimizing compression coding of the difference image and transmission of the compression-coded difference image from among one or more box pattern including the difference image; a compression coding unit for performing compression coding of the difference image using each of boxes constituting the pattern determined by the pattern determination unit as a unit of compression coding; and a transmitting unit for transmitting the compression-coded difference image.

Preferably, the image transmission apparatus further comprises a change instruction unit for accepting an instruction on a change from a current output of an image before changing by an image output apparatus to an output of a image after changing desirably, and the difference image specifying unit specifies the difference image indicating the difference between the image before changing currently output by the image output apparatus and the image after changing desirably, and the transmitting unit transmits the compression-coded difference image to the image output apparatus.

Preferably, the transmitting unit transmits position information of the difference image to the image output apparatus.

The presently disclosed subject matter provides an image transmission method to be performed by one or more computer, comprising: specifying a difference image indicating a difference between an image before changing and an image after changing, a step of determining a pattern for optimizing compression coding of the difference image and transmission of the compression-coded difference image from among one or more box pattern including the difference image, a step of performing compression coding of the difference image using each of boxes constituting the determined pattern as a unit of compression coding, and a step of transmitting the compression-coded difference image.

A computer-readable recording medium on which a program for causing a computer to execute the image transmission is non-transitorily recorded, is also included in the presently disclosed subject matter.

The presently disclosed subject matter provides an image output apparatus comprising: a receiver unit for receiving the difference image and position information of the difference image from the image transmission apparatus; an output unit for outputting an image; an expansion unit for decoding and expanding the difference image; and a controller unit for controlling the output unit so as to substitute a part indicated by the position information of the difference image in the image before changing with the decoded and expanded difference image and to output the image.

The presently disclosed subject matter provides an image transmission system comprising: a difference image specifying unit for specifying a difference image indicating a difference between an image before changing and an image after changing; a pattern determination unit for determining a pattern for optimizing compression coding of the difference image and transmission of the compression-coded difference image from among one or more box pattern including the difference image; a compression coding unit for performing compression coding of the difference image using each of boxes constituting the pattern determined by the pattern determination unit as a unit of compression coding; a transmitting unit for transmitting the compression-coded difference image and position information of the difference image; a receiver unit for receiving the difference image and position information of the difference image; an output unit for outputting an image, an expansion unit for decoding and expanding the difference image; and a controller unit for substituting a part indicated by the position information of the difference image in the image before changing with the decoded and expanded difference image and outputting the image to the output unit.

According to the presently disclosed subject matter, because a part of image data required by a client is coded by compression coding and is transmitted, the client only have to expand the received partial image and update the display, and therefore the load of display processing on the client can be kept low.

BRIEF DESCRIPTION OF THE DRAWINGS

FIGS. 11A and 10B are diagrams illustrating examples of a small box without difference;

DETAILED DESCRIPTION OF THE PREFERRED EMBODIMENTS

Figure 1:
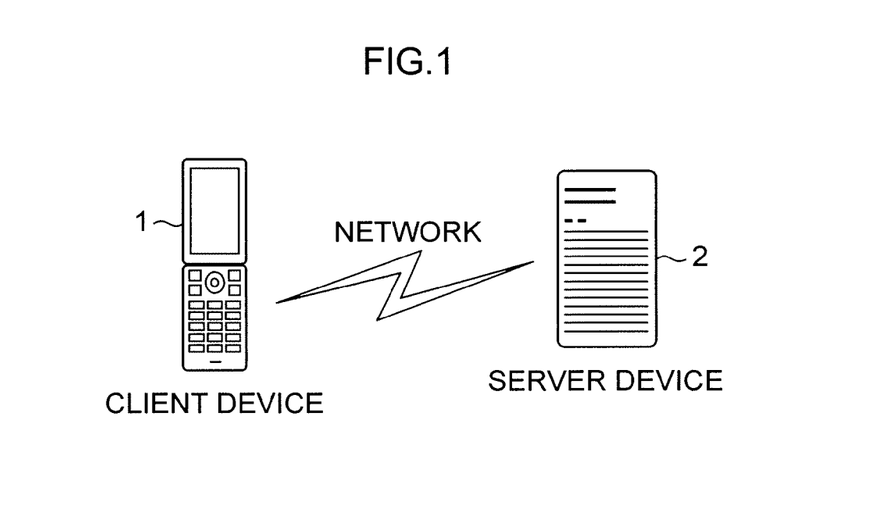
FIG. 1 is a diagram illustrating an overview configuration of an image display system.

FIG. 1 illustrates an overview configuration of an image display system of the preferred embodiments of the presently disclosed subject matter. This system includes a client device 1 and a server device 2. The client device 1 and the server device 2 are connected with each other via a network. The network can be established with publicly known communication methods such as mobile communication networks, the Internet, LAN (Local Area Network), wireless networks including infrared communications and Bluetooth, and wired networks including USB (Universal Serial Bus) cables, or combinations of a part or all of these methods. The network having on-demand data communication path is sufficient, but the network does not have to enable continuous connections.

Figure 2:
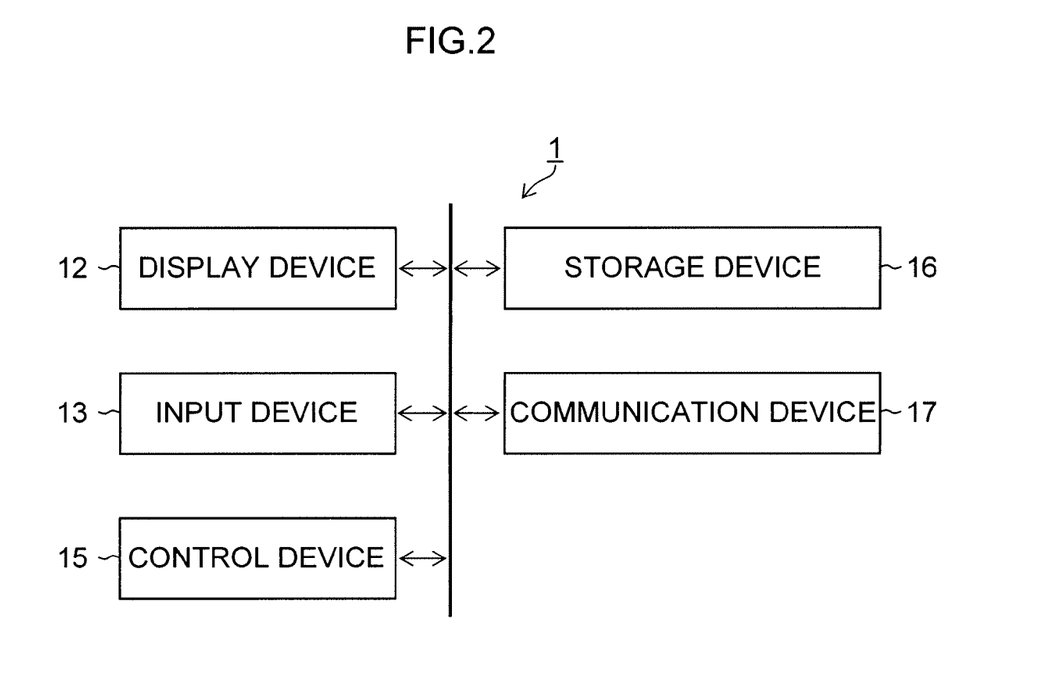
FIG. 2 is a diagram illustrating an internal configuration of the client device.

FIG. 2 illustrates an internal configuration of the client device 1. The client device 1 includes a display device 12 (a liquid-crystal display, its driver etc.), an input device 13 (keys, buttons, switches, a touch panel etc.), a control device 15 (circuits necessary for image capture setting processing, test processing, and control processing such as CPU, RAM (Random Access Memory), and ROM (Read Only Memory)), a storage device 16 (RAM, ROM, EEPROM (Electronically Erasable Programmable ROM), SDRAM (Synchronous Dynamic RAM), VRAM (Video RAM), memory card etc.), and a communication device 17 (Ir, Bluetooth, LAN network adapter etc.). The client device 1 can be made up of a publicly known portable information terminal device such as a mobile phone, PDA (Personal Digital Assistance), and a mobile personal computer.

Figure 3:
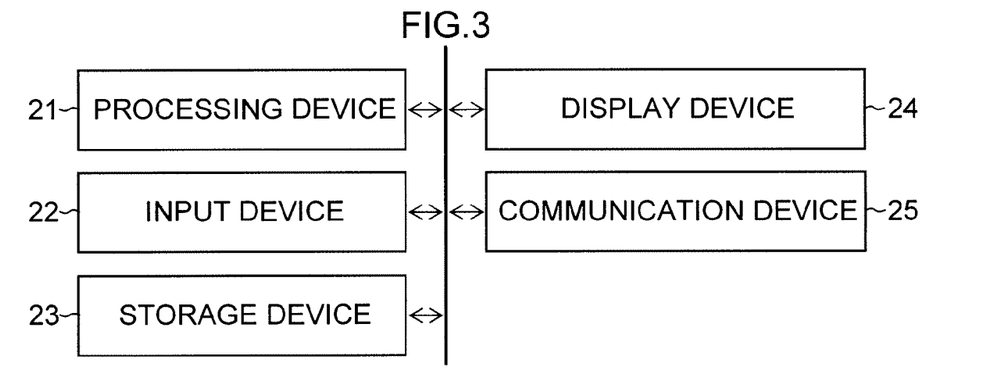
FIG. 3 is a diagram illustrating an internal configuration of the server device.

FIG. 3 illustrates an internal configuration of the server device 2. The server device 2 includes a processing device 21 (circuits necessary for operation processing and control processing in each unit such as CPU, RAM, and ROM), an input device 22 (keys, buttons, switches, a touch panel etc.), a storage device 23 (RAM, ROM, EEPROM, SDRAM, VRAM, memory card etc.), a display device 24 (a liquid-crystal display, its driver etc.), and a communication device 25 (Ir, Bluetooth, LAN network adapter etc.).

Based on a delivery request of a desired image from the client device 1, the server device 2 acquires from the storage device 23 a compressed record image that corresponds to identification information (hyperlink, image file name, etc.) of the requested image. The compressed record image is compressed image data generated by dividing an original image data into multiple areas and by processing the areas separately via compression processing in accordance with the compression technology such as JPEG, JPEG2000, MPEG (moving image). In a case of JPEG compression, the original image data undergoes discrete cosine transform (DCT) and quantization. In a case of baseline JPEG, the quantized data is encoded by Huffman code to obtain coded data. In a case of JPEG2000 compression, the original image data undergoes discrete wavelet transform (DWT), quantization and entropy encoding by the EBCOT scheme (entropy encoding in units of bit planes).

The structure of a JPEG image file is described below. The beginning is a SOI marker (two-byte specific data string) indicating the start of JPEG data followed by segments indicating compression parameters called DQT and DHT. The head of the segments has a two-byte marker indicating the segment type followed by indication of two-byte segment length, and these data can be skipped if the segment data is not necessary. Some segments are even unnecessary. After several segments, an SOS marker follows, and the SOS marker and after are the image data body.

The image data is stored in units of macro blocks called MCU after (subsequent to) the SOS marker. In JPEG compression, MCU is in 8×8 pixel unit or in 16×16 pixel unit. More specifically, the number of colors and sampling ratio are written in the SOF segment, and the pixel unit can be determined by referring to the SOF segment. For example, when the number of colors is 1, or when the number of colors is 3 and the sampling ratio is 4:4:4, MCU is in 8×8 pixel unit. Further, when the number of colors is 3 and the sampling ratio is 4:2:0, MCU is in 16×16 pixel unit.

When the number of colors is 3 and the sampling ratio is 4:2:0 in combination, if the three colors specified in the number of colors are Y, Cb, and Cr, MCU of the macro block of the original image 16×16 pixel unit consists of six block data including four 8×8 pixel blocks of Y and two 8×8 pixel blocks of each of sampled (or reduced) Cb and Cr.

In data of each block, 64 quantized representative values of DCT (discrete cosine transform) coefficients are written from $0^{th}$ to $63^{rd}$ along a zigzag order from low frequency components (upper left) to high frequency components (lower right). In other words, 64 DCT coefficients are quantized by dividing each of the DCT coefficients by a quantization width or a quantization step, which corresponds to a prescribed quantization table, and then by rounding off the divided value after the decimal point.

Because the quantized DCT coefficients is coded by variable-length coding (entropy encoding) using Huffman code etc., blocks unnecessary to output cannot be skipped according to information such as "the block completed after X bytes." If the DCT coefficients in a block are all zero after a specific number, the DCT coefficients after the specific number can be omitted by describing an EOB marker.

The EOB is a code denoting that the quantized representative values of subsequent DCT coefficients in the block are all zero. In the DCT coefficient table obtained from DCT, DCT coefficients of low spacial frequency that easily expose image degradation are placed upper left of the table and toward the lower right of the table, DCT coefficients of higher spacial frequency that do not easily expose image degradation are placed. The quantized representative values undergo entropy encoding in a zigzag manner from the upper left to the lower right of the table, and this order is referred to as a zigzag order. Accordingly, when the values undergo entropy decoding in this zigzag order, the quantized representative values representing lower spacial frequency DCT coefficients are decoded first (earlier). An EOB is added to the head of a sequence of quantized representative values of zero.

The server device 2 transmits the acquired compressed image to the client device 1. The client device 1 decodes and expands the received image, and allows for output of the image by displaying a part or the entire image on the display device 12, or transferring the image to an external printer.

Figure 4:
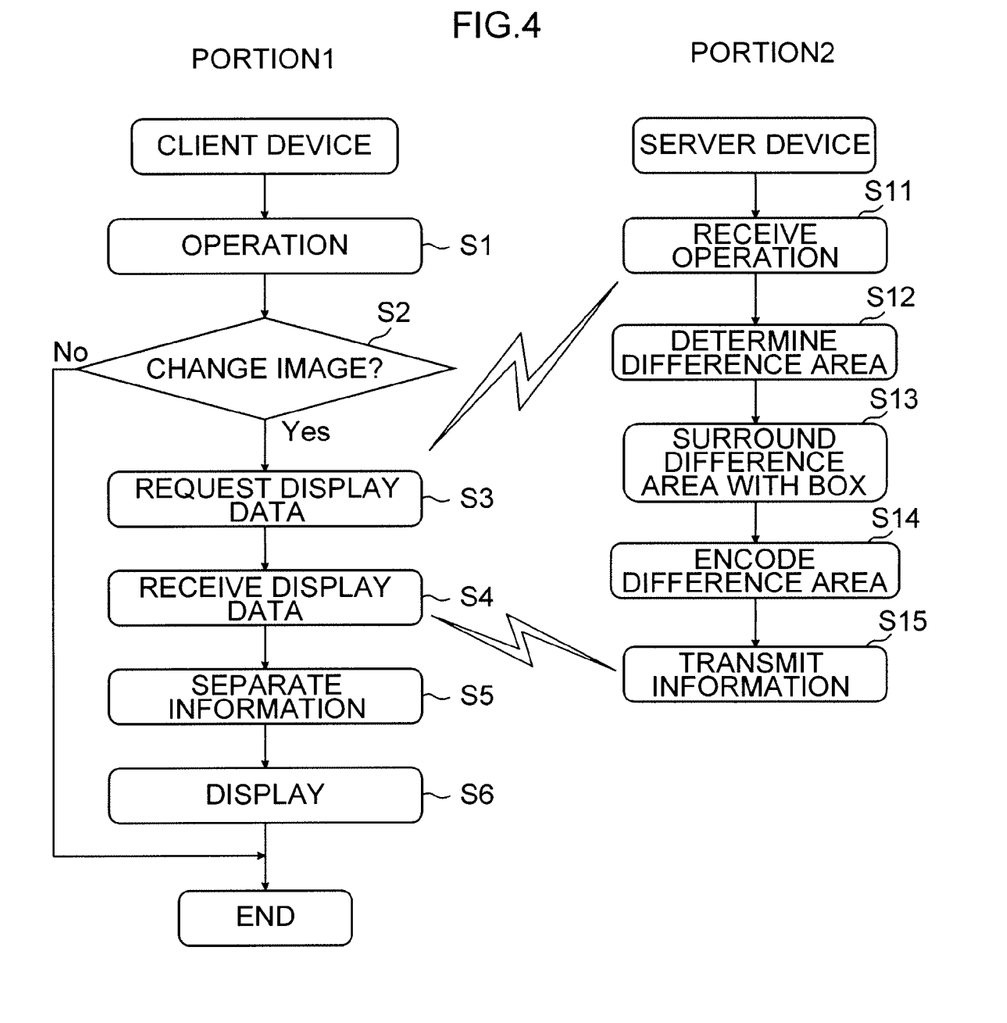
FIG. 4 shows flowcharts of image display processing according to the first embodiment.

FIG. 4 shows flowcharts of the image display processing executed by the image display system. In FIG. 4, Portion 1 shows a flowchart of processing executed by the client device and Portion 2 shows a flowchart of processing executed by the server device. A program for causing the control device 15 of the client device 1 to execute S1 to S6 of this processing and a program for causing the processing device 21 of the server device 2 to execute S11 to S15 of this processing are stored in the storage device 16 and the storage device 23, respectively.

Figure 5A:
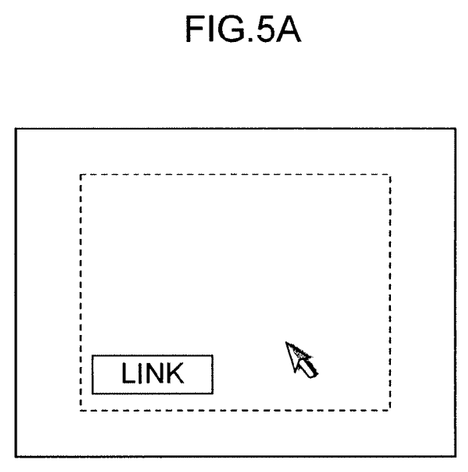
FIGS. 5A and 5B are diagrams illustrating an example of input operations related to screen display.
Figure 5B:
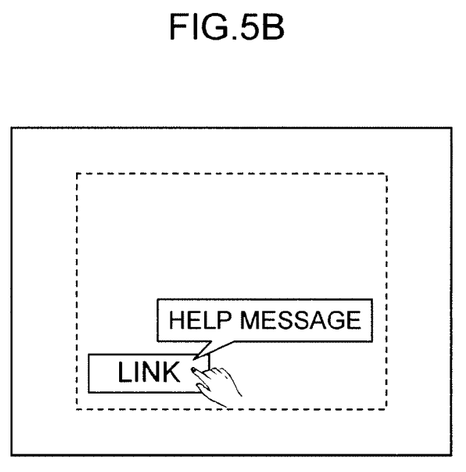

In S1, the client device 1 accepts an input operation related to screen display through the input device 13. The input operation related to screen display includes input operations related to GUI (Graphic User Interface) operations such as an instruction to start displaying a dropdown list, an instruction to start inputting a text box, an instruction to input text in the text box, an instruction to point (select) a hyperlink, an instruction to select an icon, an instruction to press a button, an instruction to display a dialog box, an instruction to display a message box, an instruction to delete an icon, an instruction to highlight an icon, an instruction to display a popup window, and an instruction to expand a tree (see FIGS. 5A and 5B). Alternatively, the input operation related to screen display includes an input operation related to a change in the entire screen such as scrolling, enlargement and reduction of the screen. Or else, the input operation related to screen display includes various input operations related to a change in a part of screens in addition to the above GUI operations.

In S2, the client device 1 determines whether the input operation related to screen display, which is accepted in S1, is the input operation related to a change in screen display or not. When the operation is determined as the input operation related to a change in screen display, the client device 1 further determines whether the input operation is the input operation related to a change in the entire screen or the input operation related to a change in a part of the screen. When the above input operation related to screen display is determined as the input operation related to a change in a part of the screen, the client device 1 moves on to S3.

In addition, when the above input operation related to screen display is determined as the input operation related to a change in the entire screen, the client device 1 requests the server device 2 to transmit the entire image corresponding to the input operation.

In S3, the client device 1 transmits to the server device 2 an image transmission request together with information indicating a position of a part to be changed as a result of the input operation related to screen display (change position information) accepted in S1 and the type of input operation. As an example, the change position information includes position coordinates of a text box, a button or an icon, which is closest to the position of the pointer when click input is performed. The coordinates of the change position can include diagonal points of a box. As an example, the type of input operation includes an icon click, selection of the dropdown list, and text box text. The server device 2, when receiving the change position information, the type of input operation, and the request, executes S11 to S15 described later, and transmits partial image information to the client device 1. The partial image information includes a difference image, which is an image of the part to be changed, and coordinates indicating the position where the difference image should be placed. The partial image information can be written in a publicly known file format such as a JPEG file or an Exif file. For example, the coordinate is recorded in tag information of an Exif file, and a JPEG compression coded difference image is recorded as compression image data of the Exif file. This Exif file is transmitted to the client device 1 as partial image information.

In S4, the client device 1 receives the partial image information transmitted from the server device 2.

In S5, the client device 1 separates the difference image and the coordinates from the received partial image information. For example, the coordinates are acquired from a header or tag information of the image file, and the difference image is acquired from the image file body. The client device 1 decodes and expands the difference image.

In S6, the client device 1 substitutes a part of image indicated by the coordinates separated in S5 in the image that is currently displayed on the display device 12 with the difference image.

In S11, the server device 2 receives a transmission request including the change position information and the type of input operation from the client device 1 transmitted in S3.

In S12, the server device 2 specifies an image that is the most recently transmitted to the client device 1 (image before changing) from among previously transmitted images in the storage device 23. The server device 2 generates partial image information based on the change position information and the type of input operation received from the client device 1 and the image before changing.

Figure 6:
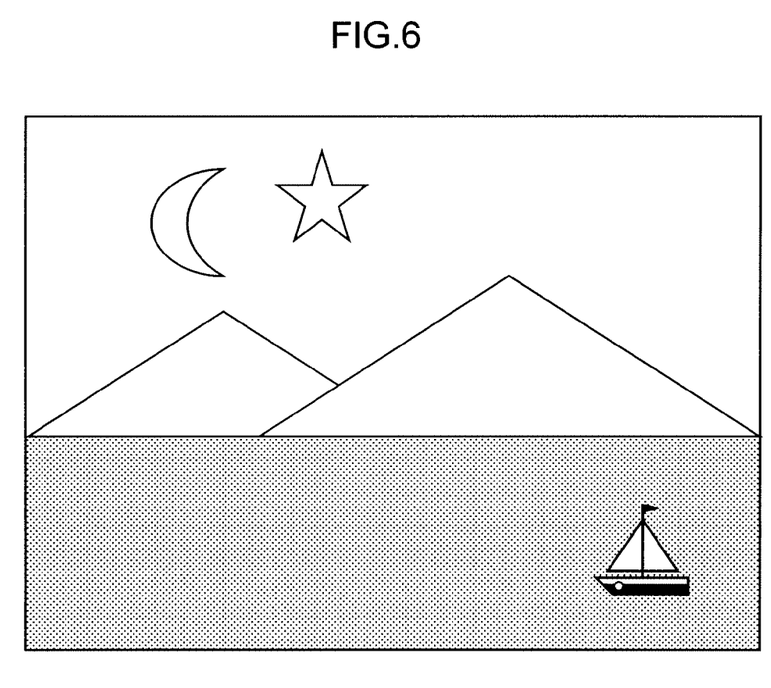
FIG. 6 is a diagram illustrating an example of an image before changing.
Figure 7:
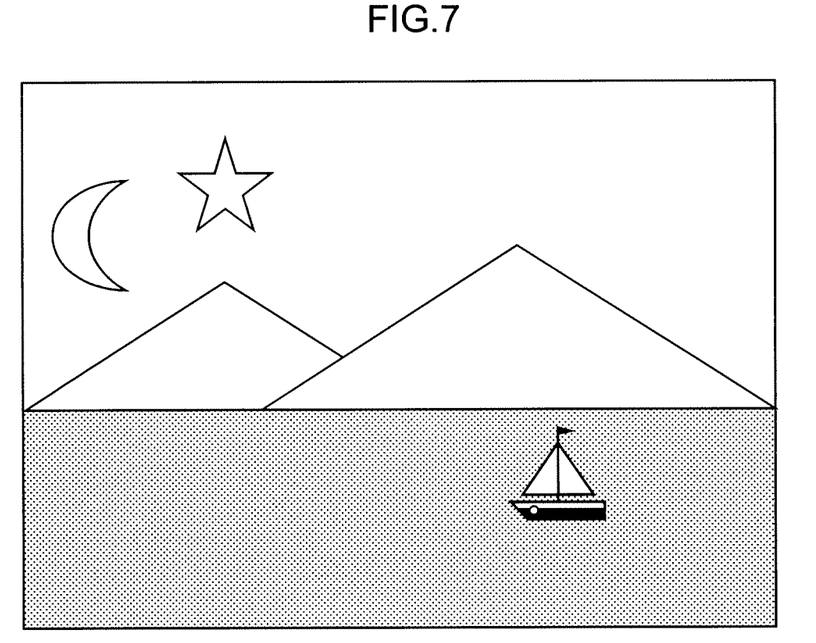
FIG. 7 is a diagram illustrating an example of an image after changing.

More specifically, the server device 2, first, acquires from the storage device 23 an image after changing corresponding to the change position information and the type of input operation notified from the client device 1. If the input operation is selection of dropdown list, for example, the corresponding image after changing would be an image in which a dropdown list is placed in the change position information and the remaining parts are the same as the image before changing. If the input operation is a pointer set to a hyperlink, the corresponding image after changing would be an image in which an underlined hyperlink and a finger-shaped pointer are placed in the change position information and the remaining parts are the same as the image before changing. Alternatively, if the input operation is a pointer set to the help menu, the corresponding image after changing would be an image in which a message box of the help menu is placed in the change position information and the remaining parts are the same as the image before changing. FIG. 6 illustrates an example of the image before changing, and FIG. 7 illustrates an example of the image after changing.

Figure 8:
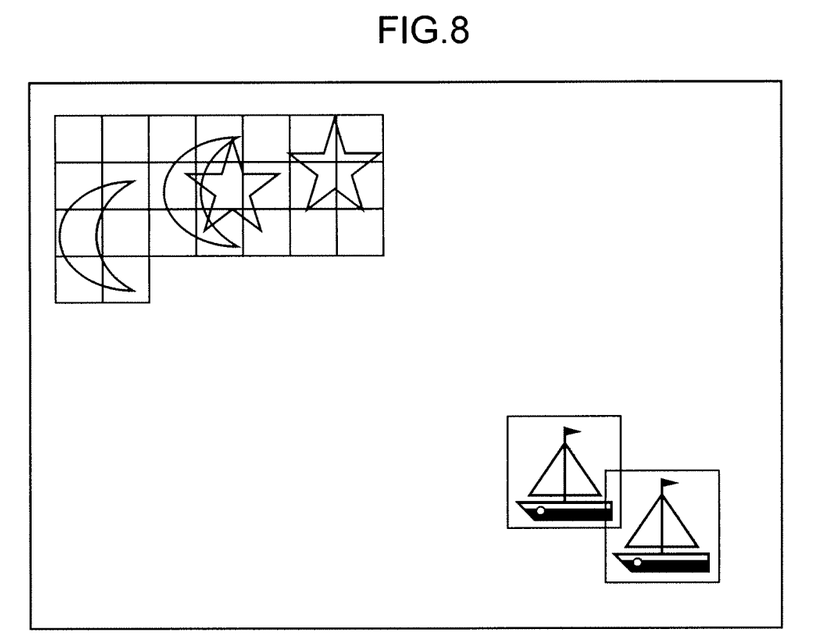
FIG. 8 is a diagram illustrating an example of a difference image.

The server device 2 compares the image before changing with the image after changing, and specifies a difference image, which is a difference in a part of image between the two images. FIG. 8 illustrates an example of the difference image. As illustrated in FIG. 8, the difference image can include two or more of separate (inconsecutive) different areas, or can include only one different area.

The server device 2 determines a box (rectangle) with the minimum area enclosing the difference image, or a pattern of an enclosing box group, which is a set of the boxes. At the time of image transmission from the server device 2 to the client device 1, the box becomes a macro block, or a unit of image compression. The horizontal and vertical size of each of the boxes making up the pattern should be identical, but any size can be employed unless the size is smaller than a certain minimum unit. The certain minimum unit of each box is a size of a standard macro block adopted in JPEG compression, i.e. any one of 8×8 pixel unit and 16×16 pixel unit.

The server device 2 specifies from among the patterns of the enclosing box group, an optimal box group that is a pattern of the enclosing box group requiring the shortest response time in accordance with the following Equation.

Response time=$C1 \times S$(area)×communication speed+ $C2 \times N$(the number of boxes)+time required for processing (Equation)

Here, C1 and C2 are fixed values stored in the storage device 23, and C2 is a value dependent on JPEG image processing capacity (determined according to models and configuration) of the client device 1. The area is the total area of all macro blocks included in the enclosing box group. The communication speed is a speed of image communication on the network that connects the client device 1 and the server device 2.

As the area of an image other than the difference image included in the pattern of the enclosing box group becomes larger, the volume of unnecessary image data transmitted to the client device 1 becomes larger. Conversely, transmission of unnecessary image data to the client device 1 can be reduced as much as the area of an image other than the difference image included in the pattern of the enclosing box group becomes smaller. The value of "C1×area×communication speed" in the equation denotes transmission quantity of an image including unnecessary part.

Meanwhile, if the number of boxes included in the pattern of the enclosing box group is large, the number of execution of expansion processing routine for each box in the client device 1 is increased. This is because a box is a unit of image compression/expansion processing. The value of "C2×the number of boxes" in the equation denotes the number of execution of expansion processing routine.

When the area of unnecessary image, which is not changed part, is large in each of the boxes making up the pattern of the enclosing box group, the size of each box becomes large while the number of boxes is reduced. Conversely, when the number of boxes is increased, the area of unnecessary image is reduced while the number of routine is increased. In other words, the transmission quantity of unnecessary image and the number of execution of expansion processing routine bear a tradeoff relationship. S and N that minimizes the response time can be obtained by using the solution of the secondary optimization problem. A solution to optimize the transmission data volume of the compression-coded difference image can be obtained instead of the solution to minimize the response time.

In S13, the server device 2 sets each of the boxes that make up the optimal box group specified in S12 as a unit of macro block.

In S14, the server device 2 performs compression coding of the difference image in units set in S13.

In S15, the server device 2 transmits partial image information including the compression-coded difference image of S14 and the coordinates of the difference image to the client device 1. In addition, the server device 2 transmits the entire requested image when receiving a transmission request of the entire image or when receiving a transmission request for the first time. If both of the client device 1 and the server device 2 store the common encoding/decoding rules (e.g. Huffman code book), the server device 2 doses not have to transmit the rules together with the changed part every time to the client device 1.

In the above manner, the server device 2 performs compression-coding of data of only a part of an image required by the client device 1 and transmits the data. For that reason, the client device 1 only has to expand the received partial image and to updates the display, and as a result the load of the display processing of the client device 1 can be reduced. In addition, the server device 2 performs the compression-coding in units that optimize the compression and transmission time of the image data of the part required by the client device 1. For that reason, the communication load of the server device 2 and the client device 1 can be kept low.

<Second Embodiment>

Figure 9:
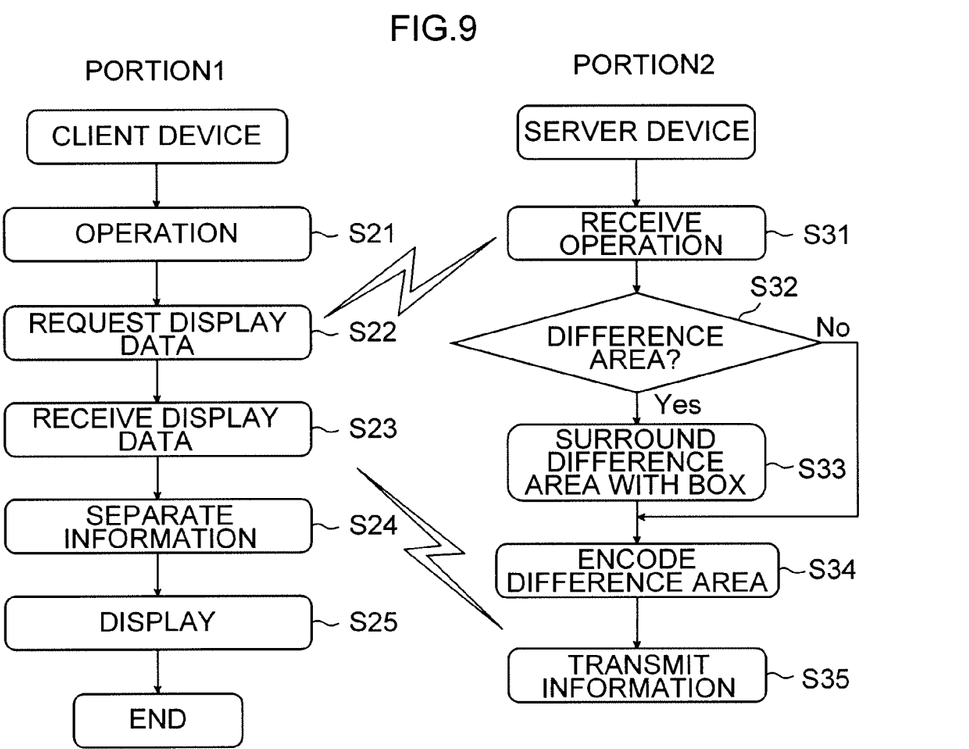
FIG. 9 shows flowcharts of the image display processing according to the second embodiment.

FIG. 9 shows flowcharts of the image display processing executed by the image display system. In FIG. 9, Portion 1 shows a flowchart of processing executed by the client device and Portion 2 shows a flowchart of processing executed by the server device. A program for causing the control device 15 of the client device 1 to execute S21 to S25 of this processing and a program for causing the processing device 21 of the server device 2 to execute S31 to S35 of this processing are stored in the storage device 16 and the storage device 23, respectively.

In S21, the client device 1 accepts an input operation related to screen display through the input device 13. This step is the same as S1.

In S22, the client device 1 requests the server device 2 to transmit an image corresponding to the above input operation related to screen display. This request includes information indicating a position of a part to be changed as a result of the above input operation related to screen display (change position information) and the type of input operation.

In S23, the client device 1 receives the partial image information transmitted from the server device 2.

In S24, the client device 1 separates the difference image and the coordinates from the received partial image information.

In S25, the client device 1 substitutes a part of image indicated by the coordinates separated in S24 in the image that is currently displayed on the display device 12 with the difference image.

S31 is the same as S11.

In S32, the server device 2 determines whether the input operation related to screen display, which is accepted in S21, is the input operation related to a change in screen display or not. When the operation is determined as the input operation related to a change in screen display, the server device 2 further determines whether the input operation is the input operation related to a change in the entire screen or the input operation related to a change in a part of the screen. When the above input operation related to screen display is determined as the input operation related to a change in a part of the screen, the server device 2 moves on to S33.

S33 is the same as S12 and S13. In addition, S34 to S35 are the same as S14 to S15. However, when the server device 2 determines the above input operation as the input operation related to a change in the entire screen in S32, the server device 2 transmits the entire image corresponding to the input operation to the client device 1. Whether the change in the image corresponding to the input operation is the change in a part of the image or in the entire image can be determined by the server device 2 in this manner.

<Third Embodiment>

The server device 2 can also specify the optimal box group that is a pattern of the enclosing box group requiring the shortest response time from among the patterns of the enclosing box group in the following manner.

First, the server device 2 generates meshes on the entire image (the mesh size is 16×16 pixel, for example), and stores a mesh containing a difference, or a difference image. The processing time can be reduced by scanning even-numbered rows in the meshes first and scanning odd-numbered rows later.

Figure 10A:
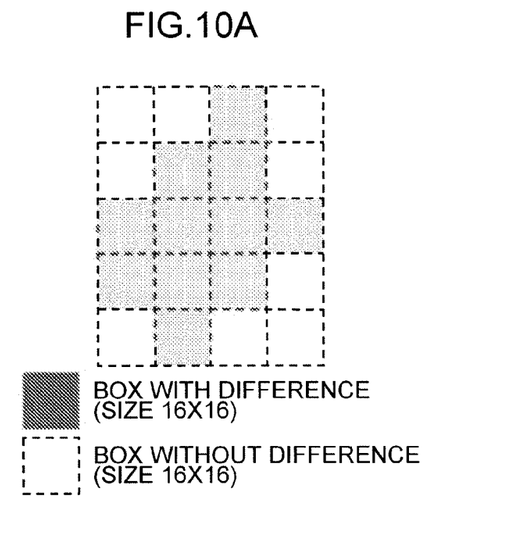
FIGS. 10A and 10B are diagrams illustrating an example of meshes (boxes) with difference and an example of box (rectangle) surrounding the boxes with difference.
Figure 10B:
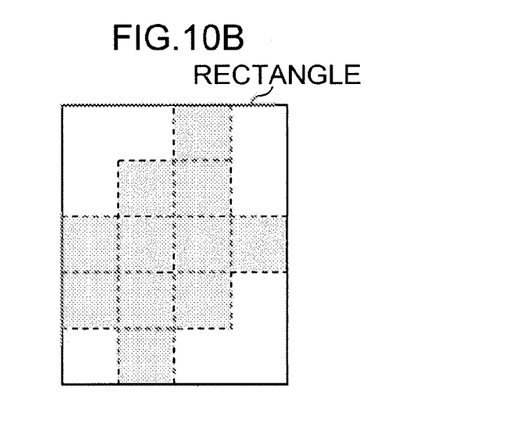

Next, the server device 2 encloses (surrounds) meshes corresponding to the difference image with a rectangle (FIGS. 10A and 10B). FIGS. 10A and 10B show an area including boxes with difference, in which darkened boxes have difference, and white boxes have no difference. In. FIG. 10B, the darkened boxes are enclosed (surrounded) with a rectangle indicated by a solid line.

The server device 2, next, searches for a small box without difference (horizontal side 16 pixels, vertical side $\geqq$32 pixels) along the four sides of a large box. Here, as a default setting, a box without difference (horizontal side 16 pixels, vertical side 16 pixels) is not included in the search objects.

Figure 11A:
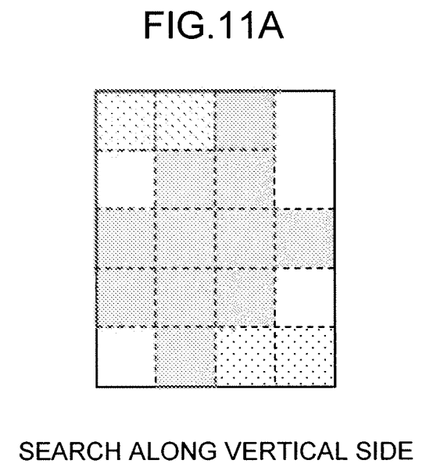
Figure 11B:
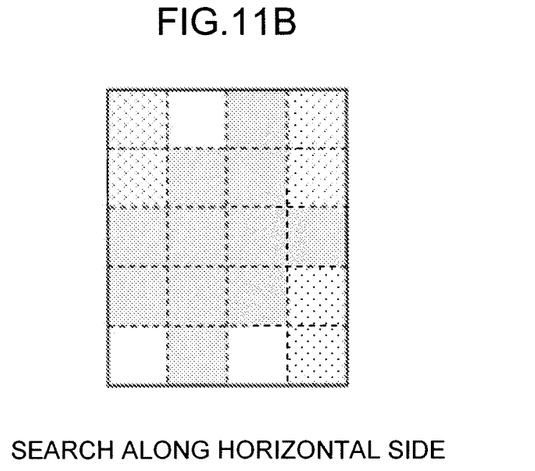

For example, pale tone parts in FIGS. 11A and 11B indicate the searched small boxes without difference.

Next, the server device 2 divides the large box into two boxes based on the boxes in a part without difference. All the patterns of dividing into two boxes are illustrated in FIG. 12A to FIG. 12C.

Figure 12A:
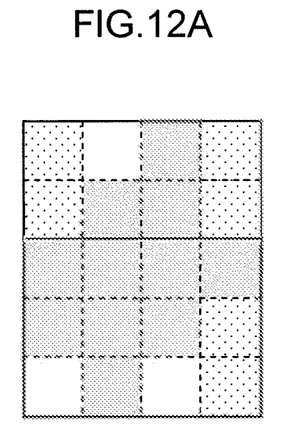
FIGS. 12A to 12C are diagrams illustrating examples of dividing a large box into 2 boxes based on small boxes without difference.
Figure 12B:
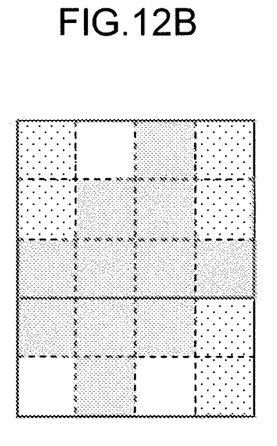
Figure 12C:
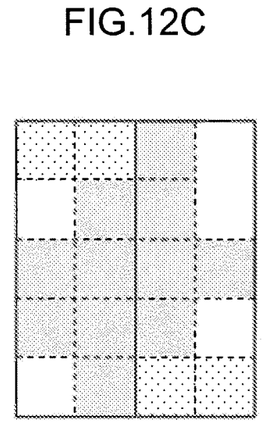
Figure 13A:
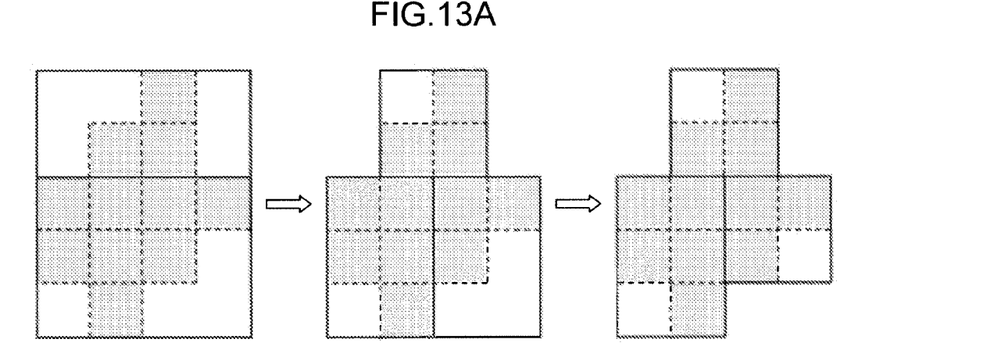
FIGS. 13A to 13C are diagrams illustrating examples of a pattern in which the clipped area is the largest.
Figure 13B:
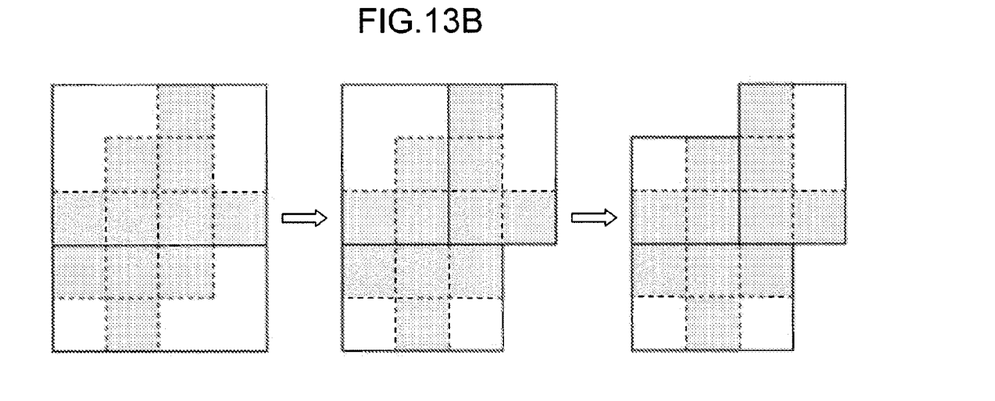
Figure 13C:
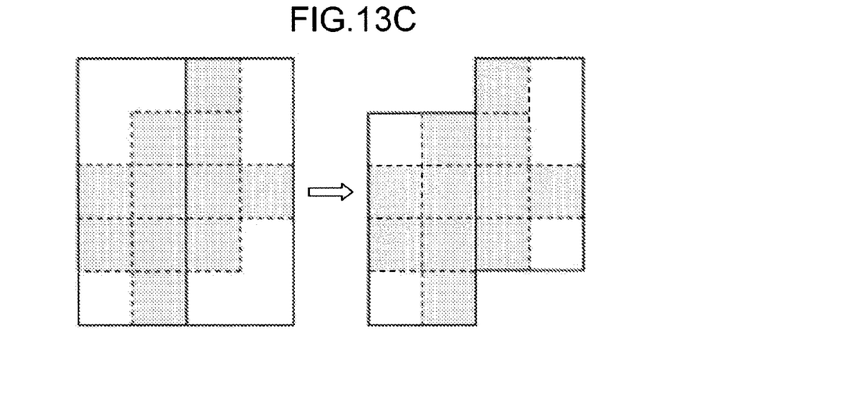

When the server device 2 divides the large box into two smaller boxes along the horizontal side, the examples are illustrated in FIG. 12A and FIG. 12B. When the server device 2 divides the large box into two smaller boxes along the vertical side, the example is illustrated in FIG. 12C. From among the patterns of dividing into two smaller boxes, the server device 2 selects a pattern in which the clipped area is the largest. For example, the large box is divided into two smaller boxes as in FIGS. 13A and 13B, the pattern shown in FIG. 12A is selected.

The server device 2, next, divides the image based on the pattern in which the clipped area is the largest. When the image is divided, two new boxes are generated. The server device 2 sets the processing back to searching for a small box without difference, and repeats the same processing as the above processing to determine whether the new box can be divided into two boxes or not until the area cannot be reduced any further.

While examples and embodiments of the presently disclosed subject matter have been explained in detail, the presently disclosed subject matter is not limited to the above, needless to say, various improvements and modifications may be added without departing from the scope of the presently disclosed subject matter. For example, the presently disclosed subject matter also includes a computer-readable recording medium on which a program for causing a computer to execute the image transmission is non-transitorily recorded.

What is claimed is:

1. An image transmission apparatus, comprising:
   a difference image specifying unit for specifying a difference image indicating a difference between an image before changing and an image after changing;
   a pattern determination unit for determining a pattern for optimizing compression coding of the difference image and transmission of the compression-coded difference image from among one or more box pattern including the difference image;
   a compression coding unit for performing compression coding of the difference image using each of boxes constituting the pattern determined by the pattern determination unit as a unit of compression coding; and
   a transmitting unit for transmitting the compression-coded difference image.

2. The image transmission apparatus of claim 1, further comprising
   a change instruction unit for accepting an instruction on a change from a current output of an image before changing by an image output apparatus to an output of a image after changing desirably,
   wherein the difference image specifying unit specifies the difference image indicating the difference between the image before changing currently output by the image output apparatus and the image after changing desirably, and
   the transmitting unit transmits the compression-coded difference image to the image output apparatus.

3. The image transmission apparatus of claim 2, wherein the transmitting unit transmits position information of the difference image to the image output apparatus.

4. An image output apparatus, comprising:
   a receiver unit for receiving the difference image and position information of the difference image from the image transmission apparatus according to claim 3;
   an output unit for outputting an image;
   an expansion unit for decoding and expanding the difference image; and
   a controller unit for controlling the output unit so as to substitute a part indicated by the position information of the difference image in the image before changing with the decoded and expanded difference image and to output the image.

5. An image transmission method to be performed by one or more computer, comprising:
   specifying a difference image indicating a difference between an image before changing and an image after changing;
   determining a pattern for optimizing compression coding of the difference image and transmission of the compression-coded difference image from among one or more box pattern including the difference image;
   performing compression coding of the difference image using each of boxes constituting the determined pattern as a unit of compression coding; and
   transmitting the compression-coded difference image.

6. A non-transitory recording medium on which a program for causing a computer to execute an image transmission is non-transitorily recorded, the program comprising computer-executable instructions of:
   specifying a difference image indicating a difference between an image before changing and an image after changing;

determining a pattern for optimizing compression coding of the difference image and transmission of the compression-coded difference image from among one or more box pattern including the difference image;

performing compression coding of the difference image using each of boxes constituting the determined pattern as a unit of compression coding; and transmitting the compression-coded difference image.

7. An image transmission system, comprising:

a difference image specifying unit for specifying a difference image indicating a difference between an image before changing and an image after changing;

a pattern determination unit for determining a pattern for optimizing compression coding of the difference image and transmission of the compression-coded difference image from among one or more box pattern including the difference image;

a compression coding unit for performing compression coding of the difference image using each of boxes constituting the pattern determined by the pattern determination unit as a unit of compression coding;

a transmitting unit for transmitting the compression-coded difference image;

a receiver unit for receiving the difference image and position information of the difference image;

an output unit for outputting an image;

an expansion unit for decoding and expanding the difference image; and a controller unit for substituting a part indicated by the position information of the difference image in the image before changing with the decoded and expanded difference image and outputting the image to the output unit.

* * * * *